US007136471B2

(12) United States Patent
Johnson

(10) Patent No.: US 7,136,471 B2
(45) Date of Patent: Nov. 14, 2006

(54) METHOD AND APPARATUS FOR DETECTING A SECONDARY DESTINATION OF A TELEPHONE CALL BASED ON CHANGES IN THE TELEPHONE SIGNAL PATH

(75) Inventor: John C. Johnson, Thornton, CO (US)

(73) Assignee: T-NETIX, Inc., Englewood, CO (US)

( * ) Notice: Subject to any disclaimer, the term of this patent is extended or adjusted under 35 U.S.C. 154(b) by 109 days.

(21) Appl. No.: 10/910,123

(22) Filed: Aug. 2, 2004

(65) Prior Publication Data

US 2005/0014491 A1 Jan. 20, 2005

Related U.S. Application Data

(63) Continuation of application No. 09/659,366, filed on Sep. 12, 2000, now abandoned, which is a continuation of application No. 08/866,587, filed on May 30, 1997, now Pat. No. 6,141,406.

(60) Provisional application No. 60/041,491, filed on Mar. 27, 1997.

(51) Int. Cl.
*H04M 3/00* (2006.01)
*H04B 3/20* (2006.01)
*H04M 9/08* (2006.01)

(52) U.S. Cl. ................. 379/189; 379/188; 379/406.01; 370/290; 455/570

(58) Field of Classification Search ................ 455/410, 455/417, 416, 570, 63.1, 411; 379/188, 189, 379/211.01, 211.02, 406.01, 406.02, 406.06, 379/406.08; 704/223, 226; 370/286, 289, 370/290, 291
See application file for complete search history.

(56) References Cited

U.S. PATENT DOCUMENTS

| | | | | | |
|---|---|---|---|---|---|
| 4,947,425 | A | * | 8/1990 | Grizmala et al. | 379/406.09 |
| 5,008,923 | A | * | 4/1991 | Kitamura et al. | 379/3 |
| 5,164,989 | A | * | 11/1992 | Brandman et al. | 379/406.11 |
| 5,327,489 | A | * | 7/1994 | Anderson et al. | 379/243 |
| 5,381,474 | A | * | 1/1995 | Lahdemaki et al. | 379/406.08 |
| 5,455,819 | A | * | 10/1995 | Sugiyama | 370/241 |
| 5,473,686 | A | * | 12/1995 | Virdee | 379/406.08 |
| 5,504,810 | A | * | 4/1996 | McNair | 379/189 |
| 5,535,261 | A | * | 7/1996 | Brown et al. | 379/88.11 |
| 5,539,812 | A | * | 7/1996 | Kitchin et al. | 379/189 |
| 5,577,116 | A | * | 11/1996 | Townsend et al. | 379/406.12 |
| 5,655,013 | A | * | 8/1997 | Gainsboro | 379/188 |
| 5,745,558 | A | * | 4/1998 | Richardson, Jr. et al. | 379/207.01 |
| 5,768,355 | A | * | 6/1998 | Salibrici et al. | 379/189 |
| 5,777,558 | A | * | 7/1998 | Pennypacker et al. | 340/635 |
| 5,796,811 | A | * | 8/1998 | McFarlen | 379/189 |
| 5,805,685 | A | * | 9/1998 | McFarlen | 379/189 |
| 5,859,907 | A | * | 1/1999 | Kawahara et al. | 379/406.08 |
| 5,875,230 | A | * | 2/1999 | Ganley et al. | 379/1.02 |
| 5,883,945 | A | * | 3/1999 | Richardson et al. | 379/189 |
| 5,991,617 | A | * | 11/1999 | Powell | 455/410 |

(Continued)

*Primary Examiner*—Charles N. Appiah
(74) *Attorney, Agent, or Firm*—Fulbright & Jaworski LLP

(57) ABSTRACT

A method and apparatus for detecting whether a remote party has added a secondary telephone destination to a telephone call, for example through the activation of three-way calling service, conference calling or two lining bridging, by identifying an echo characteristic to the telephone connection between the local and the remote telephone and monitoring the echo characteristic to determine whether there is a significant change. The addition of a secondary telephone destination can be verified by continuing to monitor the echo characteristic to determine whether it has returned to its original value.

16 Claims, 14 Drawing Sheets

U.S. PATENT DOCUMENTS

| | | | |
|---|---|---|---|
| 6,078,645 A * | 6/2000 | Cai et al. | 379/3 |
| 6,141,406 A * | 10/2000 | Johnson | 379/189 |
| 6,295,446 B1 * | 9/2001 | Rocha | 455/410 |
| 6,327,352 B1 * | 12/2001 | Betts et al. | 379/189 |
| 6,763,099 B1 * | 7/2004 | Blink | 379/189 |
| 6,895,086 B1 * | 5/2005 | Martin | 379/189 |
| 6,920,209 B1 * | 7/2005 | Gainsboro | 379/188 |

* cited by examiner

Basic Adaptive FIR Filter Structure

Echo Canceller Using an Adaptive FIR Filter

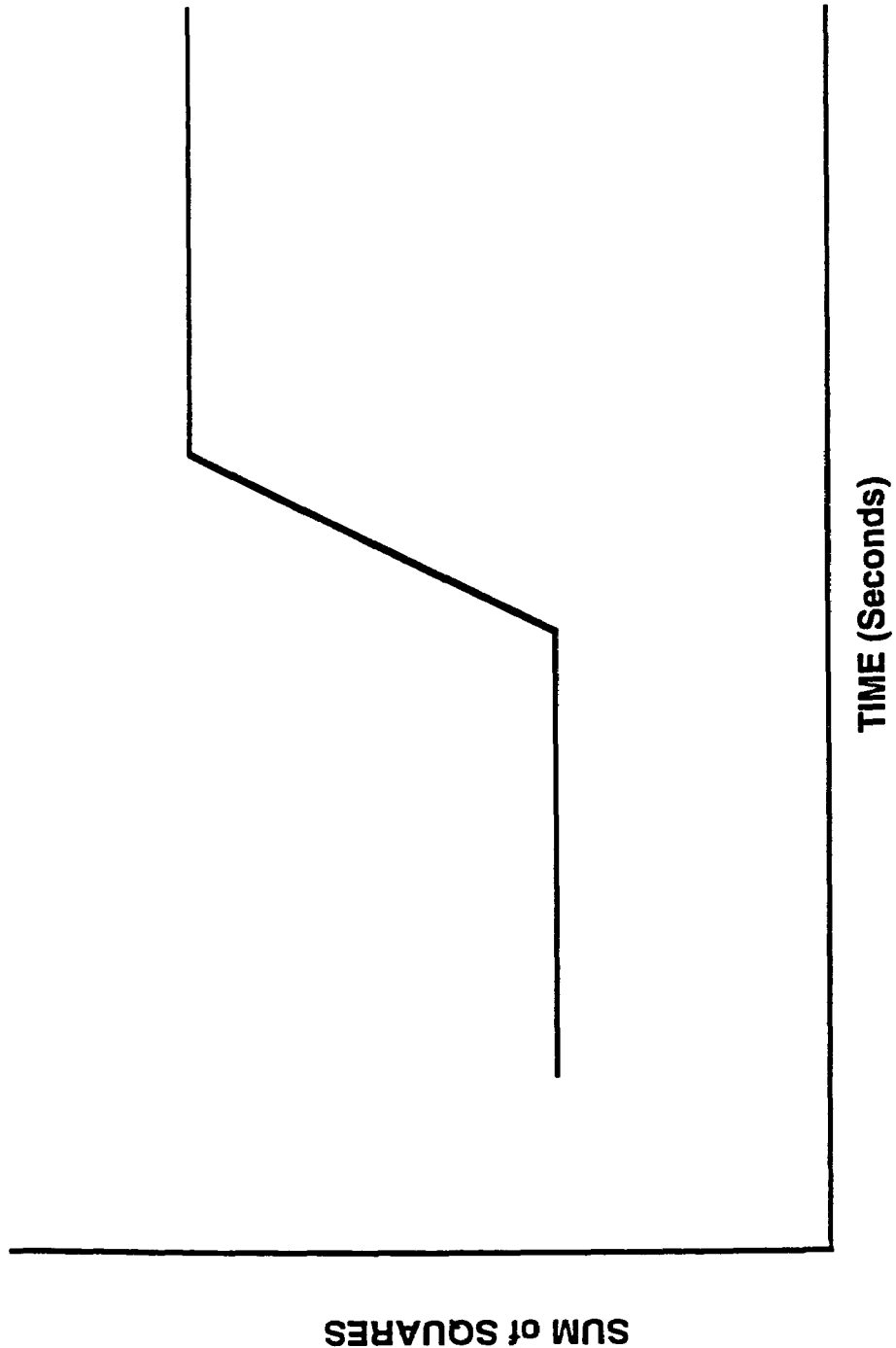

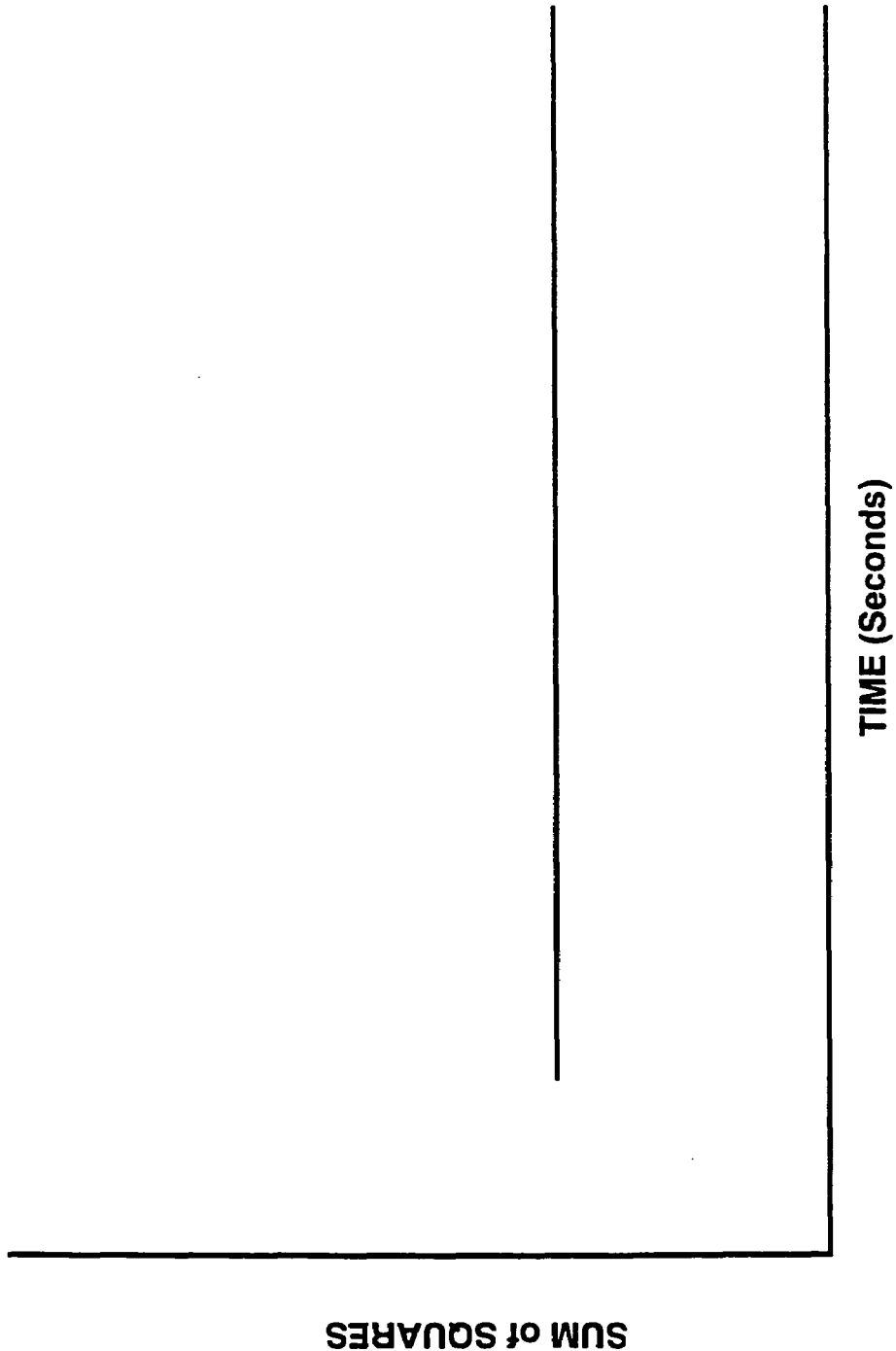

TYPICAL FILTER RESPONSE WHEN CALLED PARTY TALKS TO CALL WAITING PARTY AND THEN RETURNS TO ORIGINAL CONVERSATION

TYPICAL FILTER RESPONSE WHEN CALLED PARTY TALKS TO CALL WAITING PARTY

METHOD AND APPARATUS FOR DETECTING A SECONDARY DESTINATION OF A TELEPHONE CALL BASED ON CHANGES IN THE TELEPHONE SIGNAL PATH

This application claims priority to and is a continuation of U.S. patent application Ser. No. 09/659,366 filed Sep. 12, 2000, now abandoned which in turn is a continuation of U.S. patent application Ser. No. 08/866,587 filed May 30, 1997, now U.S. Pat. No. 6,141,406, and which claimed priority from U.S. Provisional Application No. 60/041,491 filed Mar. 27, 1997. The invention relates to a method and apparatus to detect events occurring on a telephone line based on changes in the telephone signal path during the course of the telephone transmission. In particular, the method and apparatus of the invention can detect when a call originally completed to a first telephone destination has been transferred to or conferenced with a second telephone destination. Thus, the invention can be used to detect when a three-way or conference call has occurred to include a second telephone destination after a telephone connection has been established with a first telephone.

TECHNICAL FIELD OF THE INVENTION

The invention is particularly useful to prevent the unauthorized use of three-way calling or conference calling to circumvent the security features which typically restrict telephone calls emanating from institutions, such as prisons and other correctional facilities, to certain previously approved telephone numbers. The invention is typically employed so that the detection of the three-way or conference call results in an action, such as, termination of the initial two party connection.

BACKGROUND OF THE INVENTION

Prior to a June, 1984, FCC decision, pay telephones were the exclusive province of local telephone companies. Others were precluded from the business of providing pay telephone services. Today, however, subject to state Public Utility Commission regulations, Customer Owned Coin Operated Telephone ("COCOT") service is permitted. An outgrowth of COCOT service has been the private operation of institutional telephone services.

Calls placed through COCOT equipment are frequently handled by an automated operator service ("AOS"), i.e., call handling equipment and procedures which can automatically route and complete local and long distance calls without the intervention of a live operator. Typically, an AOS has the ability to complete collect calls and to bill users of that service for both intra- and inter-LATA calls. However, the use of an AOS system opens the possibility of fraudulent activity in certain instances.

In many institutions, such as prisons, the phone calls placed by an inmate or patient are restricted to certain previously approved numbers, such as those of family, friends, defense lawyers, etc. To minimize the possibility of fraud or harassment, calls cannot be made to other numbers, such as judges, prosecutors, witnesses, commercial establishments and members of the public at large. Nevertheless, these security measures can be circumvented if an accomplice answering a phone having an approved number uses features of the phone, such as three-way or conference calling, to establish a connection with an unapproved third party telephone. To avoid these problems, it would be desirable if an AOS system utilized at a prison, for example, could be able to detect when the other, i.e., remote party, has commenced a three-way call (i.e., a three-party calling service initiated by activation of the hook switch) or a conference call (such as that resulting from the bridging of two lines). It should do so reliably, in that it should detect as many of the three-way or conference calls as possible, and it should not be subject to "false detects." False detects are at least irritating, if not expensive, for one or more of the participants to the telephone call. In particular, the AOS should not be prone to false detects resulting from certain other events, such as the announcement or activation of call waiting service which may occur during a normal telephone call.

Several methods of detecting and confirming the detection of an attempted three-way call are known in the prior art. Most of these are intended to recognize one or more changes in the electrical signal resulting from a party's flashing the hook switch to activate a three-way calling feature. The flashing results in a temporary disconnect and reconnect, which can be observed as a momentary interruption of loop current in the immediate circuit associated with the telephone at which the hook flash occurred. Since the current is not interrupted further "down the line," this technique is not available to detect a hook flash at a remote telephone, i.e., at the other telephone involved in a two-party call. In addition, it cannot distinguish between a hook flash event used for activation of three-way calling service and other hook flash events.

In addition, a battery polarity reversal may be observed at the telephone company central office when the local party performs a hook flash. However, the polarity reversal is not observable down the line to the other party to the telephone call. Thus, this attribute of a hook-flash cannot be employed as a detection mechanism, except at the local central office.

U.S. Pat. Nos. 5,319,702 and 5,539,812, which are commonly assigned to the assignee of the present invention, describe techniques to recognize certain characteristics of the signal received at a local telephone when a remote party flashes the hook switch. Although these techniques reliably detect the vast majority of hook flash signals performed by a remote party to a telephone call, they are not one hundred percent perfect under all conditions. Coupled with the "window analyzation" techniques described in the '702 Patent, these methods can also reliably differentiate an attempted three-way call from a call waiting signal. On the other hand, the techniques described in these patents do not consistently detect conference calls established by "bridging" two lines or by other techniques, such as PBX switching, which do not utilize flashing of the hook switch. In addition, the technology of the '702 and '812 Patents does not reliably detect whether a remote telephone has been forwarded.

Thus, it is desirable to provide a more infallible way of detecting attempts by a remote party to circumvent telephone security procedures, such as those typically employed with inmate telephone calls.

SUMMARY OF THE INVENTION

The present invention is based on the discovery that each telephone "connection" i.e., the establishment of an electronic path between a local and a remote party to a telephone call, has a characteristic reflection or "echo" idiosyncratic to that connection. The signal transmitted by the local party's microphone is reflected from a number of sources in the connection. The reflected signal at any other point in the path is different from the originally transmitted signal in a number of characteristics, such as, volume, (i.e., amplitude); phase; and frequency content. It has now been found that the reflection or echo usually does not change significantly once a particular telephone call is established, unless the connection, i.e., signal path, changes.

The echo characteristics of a particular telephone connection are altered, for example, when a three-way calling feature is activated by the remote party at the original destination thereby adding a third party at a secondary destination. The addition of the third party results in a change in the signal path. It has now been found that the change in signal path results in a new, characteristic reflection that can be distinguished from the old one. By continuing to monitor the echo or reflection over time, it is possible to verify that the event that caused the change was the activation of a three-way calling feature or initiation of a conference call, rather than the use of a call waiting service.

The present invention includes means for "zeroing out" or canceling the characteristic echo once a connection has been established. Preferably this is done using an adaptive FIR filter. The coefficients or "tap values" required to cancel the echo are then monitored to determine if the echo changes significantly. Significant changes are analyzed to determine their origin.

The invention also includes response means for implementing a predetermined response when an undesirable event is detected. Examples of the responses which can be pre-programmed include call termination, playing a prerecorded message, generating a tone which may be heard by one or more parties to the call, muting the microphone of the local telephone and recording the date and time of the remote party's attempt to initiate the three-way call.

The invention is suitable for use in a computer controlled telephone. However, an advantage of the present invention is that the detection apparatus may be located at a site remote from the telephone.

Although the system of the present invention is highly reliable, it may be combined with other known techniques, such as the ones referenced previously, to enhance their respective overall reliability as well.

BRIEF DESCRIPTION OF THE DRAWINGS

For convenience, the drawings are briefly described as follows:

FIGS. 2A–D shows the sum of the squares output from the adaptive FIR filter over time after establishment of the connection and the happening of certain events on the line. FIG. 2A shows the sum of the squares output from the filter after the telephone connection has been established and a three-way call has been initiated. FIG. 2B shows the sum of the squares output from the filter when a call waiting notification occurs on the line, but the third party call is not answered. FIG. 2C shows the sum of the squares output from the filter when a third party call is answered, and the answering party then returns to the original call. FIG. 2D depicts the sum of the squares output of the adaptive FIR filter when a third party call is answered and the answering party continues to talk to the third party caller.

FIG. 3A shows the apparatus as associated with a local telephone. FIG. 3B is a block diagram of the equipment as deployed in a local loop-embodiment. FIG. 3C is a block diagram of the equipment as deployed in a 4-wire E&M connection. Finally, FIG. 3D is a block diagram of the equipment as deployed in an environment where the incoming signal is already in digital format. This would occur, for example, in many network configurations utilizing pulse code modulation ("PCM") or "DSØ" signals.

In FIG. 4A, the detection device is located in connection with the local telephone. In FIG. 4B, the detection device is located between two switches. In FIGS. 4C and 4D, the detection device is located as an "adjunct" to a switch. In the configuration shown in FIG. 4C, the detection device is an adjunct to a local central office; in FIG. 4D, it is an adjunct to an "IXC," i.e., an interexchange carrier, switch.

A more complete understanding of the present invention may be derived by referring to the detailed description and claims which follow when considered in connection with the accompanying drawings.

DETAILED DESCRIPTION OF THE INVENTION

The following detailed description is provided in reference to the accompanying FIGS. 1 through 4, wherein like reference numbers indicate like features throughout the drawings.

Before describing the equipment in detail or its method of operation to detect specific events, it is helpful to understand the basic methodology. As previously noted, the invention is based on the discovery that a given connection between a local party's telephone and a remote party's telephone evidences an echo which is characteristic of that connection. This is generally true for a telephone connection, except those involving certain cellular, microwave, or satellite transmissions. Signals emanating from the local party's microphone and echoed back to the local party's receiver from the public switched telephone network ("PSTN") will be altered in one or more ways, i.e., characteristics, that are stable for the connection. The echo characteristics can be ascertained and monitored to determine whether the connection has been changed. If a significant enough change is detected, the echo characteristics can be further analyzed to determine the event which caused the change.

Figure 1A:
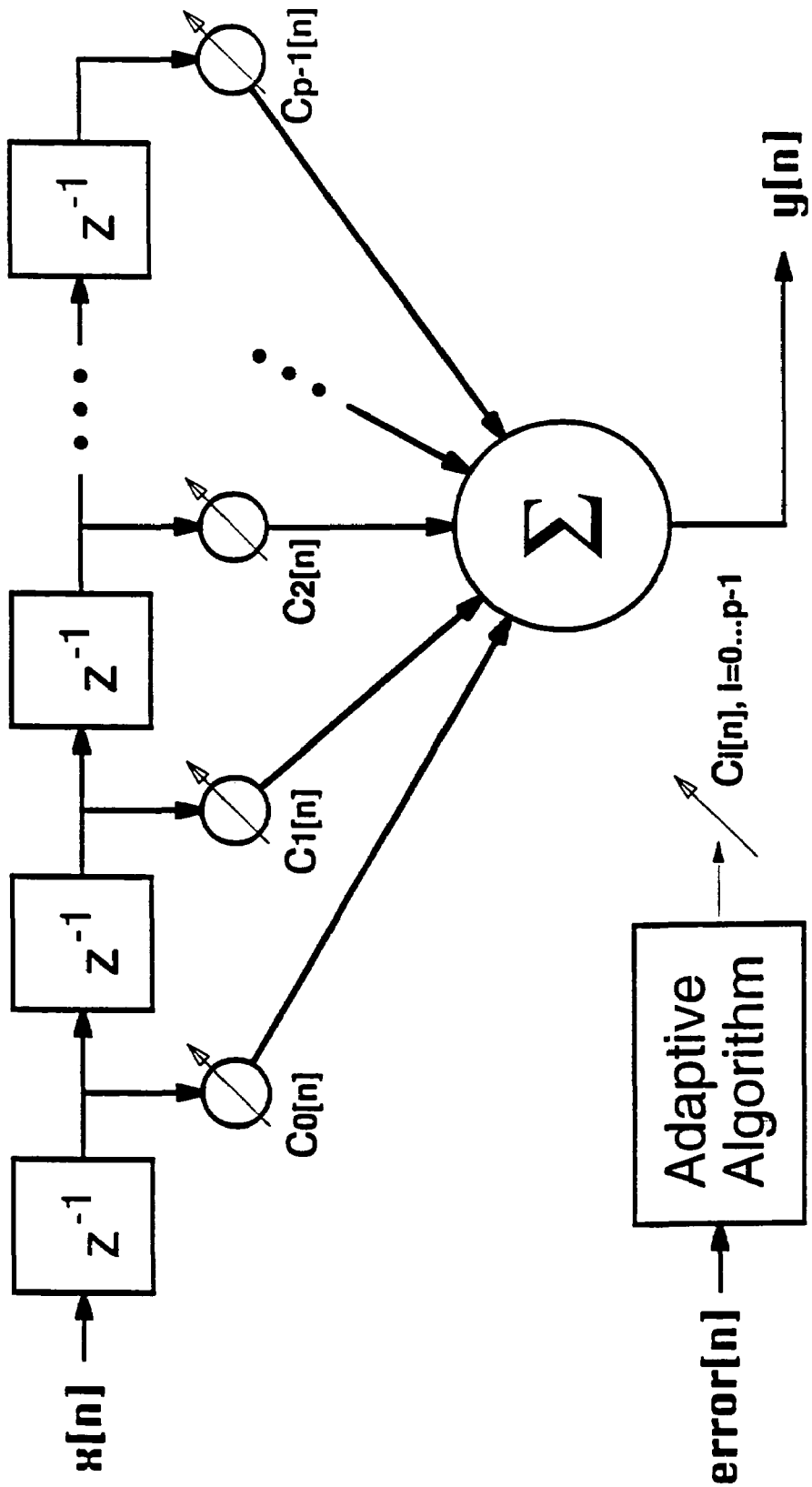
FIG. 1A is a diagram showing a typical adaptive FIR filter with variable taps.
Figure 1B:
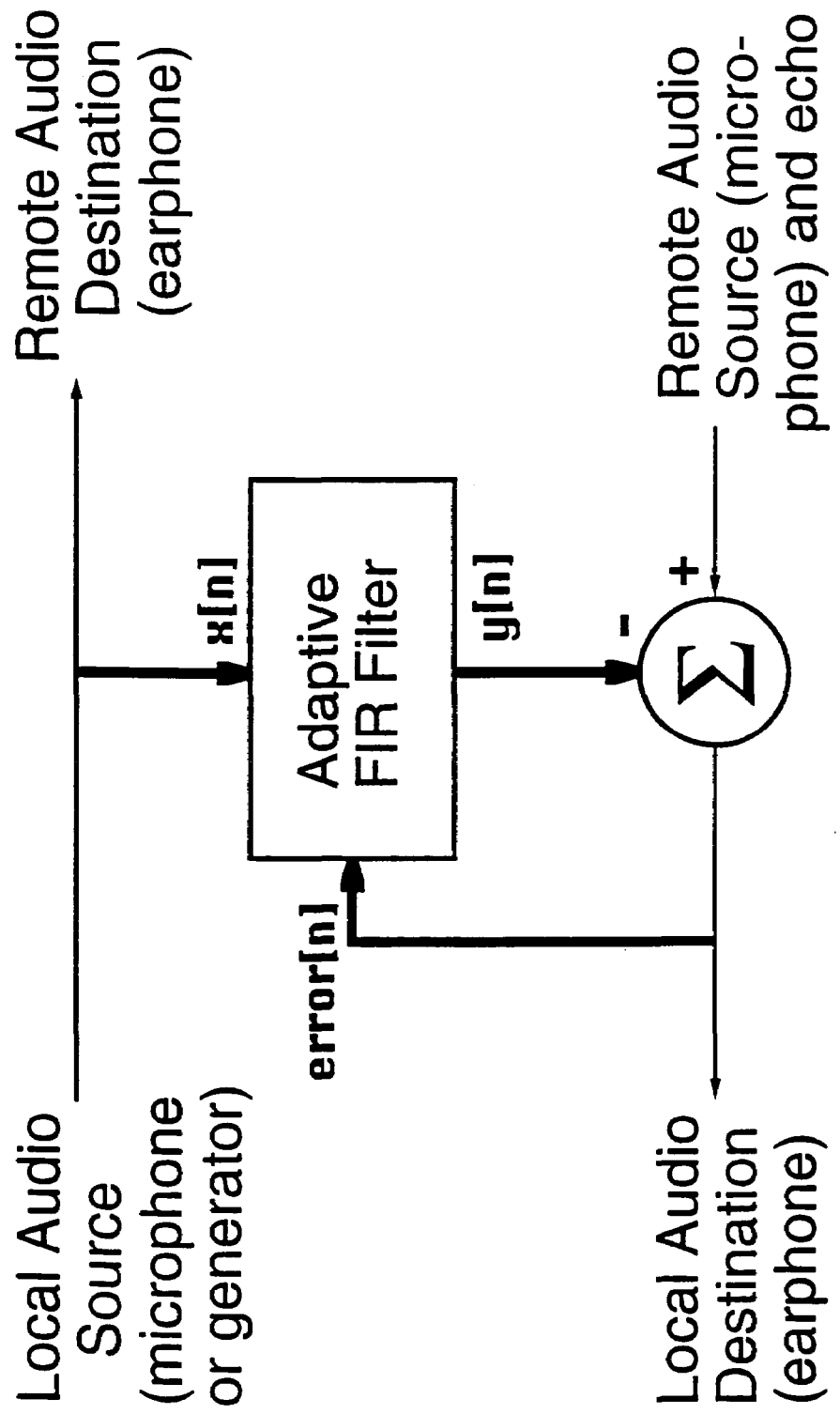
FIG. 1B shows an FIR filter arranged in accordance with one embodiment of the present invention to observe a characteristic echo.

Although several techniques are available, the preferred embodiment utilizes a standard adaptive FIR filter, i.e., an "adaptive filter," with variable taps to monitor the echo signal. An adaptive filter is shown in FIG. 1. In lieu of an adaptive FIR filter, an adaptive IIR filter may be used.

Figure 2:
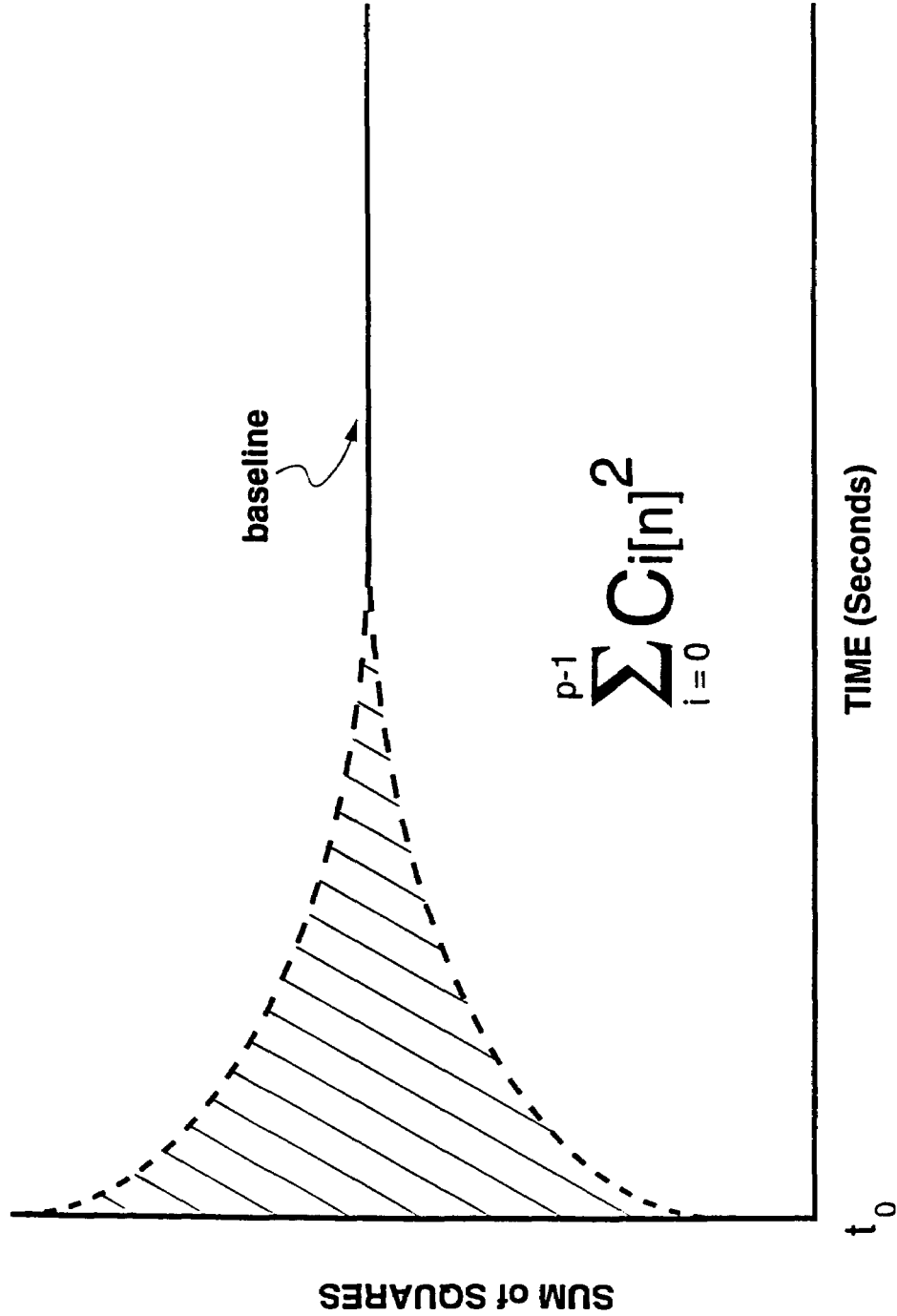
FIG. 2 shows the sum of the squares output from the adaptive FIR filter after the telephone call is established, and the filter output reaches steady state.

The output of the adaptive FIR filter immediately after establishment of a telephone call is depicted schematically in FIG. 2. When the connection is established, the line is monitored and the deviation between the echoed sound and that transmitted by the local party is minimized by the adaptive FIR filter to a baseline, by constantly making corrections until the deviation between the noise observed and the previous baseline is so small that further corrections are not made. The baseline is shown on FIG. 2 as the level period after the initial spike and the "zeroing out" of the echo. Typically, this occurs within one second after the "connection" between the local and remote telephones has been completed.

A. Method of Operation

The present invention can be used to detect events, such as a three-way call, two line conference bridging, and PBX switching to add a third party. That process comprises two parts—detecting an event of interest and then analyzing the event to confirm if it is one that warrants a response or not. Although the first part of the process can be used alone, it will not be as discriminating as the two step process. In the preferred embodiment of the invention, these functions are performed by processing digital representations of the appropriate signals. In the embodiment illustrated, these signals consist of the signal transmitted from a microphone, such as the signal on line 871 in FIG. 3A at the local telephone and the echo received back, for example, the signal on line 132. As used herein, "echo" refers to the audio signal returning from the direction of the terminating central office corresponding to the signal originating from the local phone source. The echo can be the signal as received back at the local telephone or as intercepted at any appropriate point on the trunk side of the terminating or remote central office.

Figure 4A:
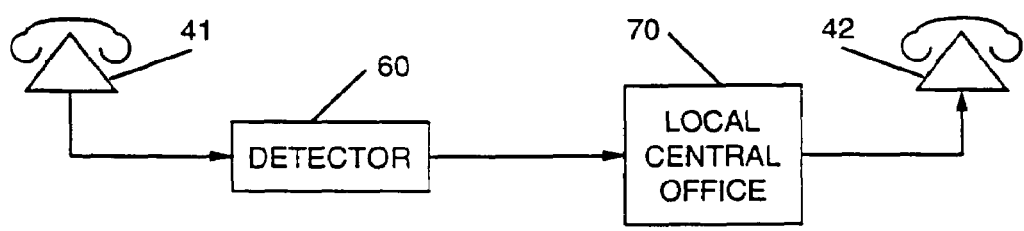
FIGS. 4A through 4D depict various options for locating the detection apparatus of the present invention relative to the local and remote telephones and the telephone network. As used herein, "local" telephone refers to the telephone whose transmitted and returned sound, i.e., "echo," are being monitored. In the applications of particular interest, the "local telephone" would typically be the telephone used by the inmate at the correctional facility. "Remote" telephone refers to the other telephone involved in the original telephone communication, for example, the called party if the inmate at the local telephone initiated the call.
Figure 4B:
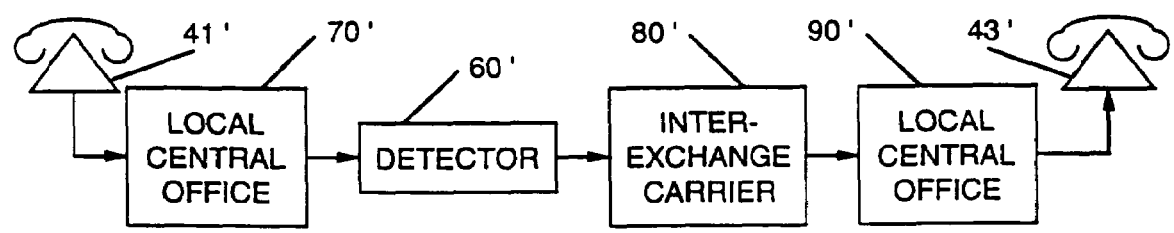

The method of the present invention is described with respect to the configuration of FIG. 4A in which the detector is associated with the local telephone. The detector utilizes the signal emanating from the local party's microphone as the baseline for comparing the echoed or reflected signal received back from the remote party's telephone. The signal emanating from the local party's microphone will normally consist of the local party's speech and any background noise.

It may also be desirable to introduce a known signal for transmission from the local telephone. For example, a broad spectrum, i.e., "white" noise, or a specific tone or frequency can be used. These signals can be generated by commonly known means, such as a white noise generator, or digital signal processing signal generation means, such as available by use of "Matlab□" software. If a specific tone is used, preferably it is noninterfering, i.e., a frequency that doesn't interfere with the voice—transmissions and doesn't "roll off" or get severely affected by the PSTN. For example, a tone generator can be used with a frequency of approximately 20 Hz. Unfortunately, it is difficult to introduce such a signal of sufficient strength that some part of the signal will reliably pass through the PSTN echo cancellation and band limiting means yet not be a distracting nuisance to the parties to the call.

On the other hand, it may be desirable to introduce a known signal at least temporarily during a telephone communication. This may occur, for example, if the local party ceases to speak for an appreciable period of time and there is insufficient background noise to produce a signal at the local microphone of sufficient strength to ensure a viable echo. During such a period of "local silence," it may be desirable to transmit a known signal from the local party's telephone. This may be done by intermittently transmitting a known signal at known intervals or by monitoring the output of the local microphone and, if it falls below a predetermined level for a specified period of time, enabling signal generation means at the local telephone to provide a signal resulting in a viable echo. This is particularly useful to ensure that echo monitoring can occur during a period when the remote party has activated a call waiting feature and is talking to the third party caller. Normally, the local party is silent during that period and absent sufficient background noise, there will be insufficient signals generated at the local telephone to provide an adequate echo for monitoring.

The known signal may be added at the local telephone or at other points in the telecommunication known to one skilled in the art appropriate for the detector configurations shown in the accompanying figures.

In the presently preferred embodiment, the invention is implemented without a specific, generated signal, but instead utilizes the normal communications themselves, i.e., the voice of the local party or other background noise received by the microphone of the local telephone. Typically, at least a portion of these sounds pass through the PSTN echo cancellation and band limiting means so that an "echo" is received at the local party's telephone. These sounds are generally not noticed by persons involved in the telephone communication. However, the echo is of sufficient strength to be monitored for a deviation caused by a change or changes in the signal path.

The method of the present invention is employed after a connection has been established between the local and remote telephones. At that time, the echo received at the local telephone is sent through an adaptive FIR filter as shown in FIG. 1. The adaptive FIR filter compares the received signal to the signal transmitted from the local party's microphone and acts to "zero out" any differences. The output of this filter over time as the call is initially established is shown in FIG. 2. The output reaches a stable condition shortly after the line connection is established between the two telephones.

The present invention is premised on certain attributes of an adaptive FIR filter. Such a filter has a set of mathematical coefficients (sometimes referred to as "tap values") which exhibit characteristics inherent to the established communication channel. These taps can be examined and monitored to see if a significant enough change has occurred to the channel characteristics, due to a three-way call, bridging of two lines, or answer of a call waiting notification, to warrant call termination or any of the other predetermined actions. Once the filter reaches a steady state or baseline condition, the tap values change in only very small amounts—barring a variation caused by a three-way call, conference call bridging, or call waiting events.

As mentioned previously, the present invention is based on the observation that the return signal from the remote party's telephone, i.e., the "echo" signal is defined by the signal path idiosyncratic to the particular telephone connection. The difference between the echo and the originally transmitted signal remains constant during the course of the communication, unless an event occurs that changes the path for the signals and, therefore, the echo.

As previously noted, the adaptive FIR filter acts to achieve a steady state characteristic between the baseline signal and the signal echoed back. Thus, as the call is initially established, there is a spike in the error output from the adaptive FIR filter. The error output from the filter diminishes to a small value, i.e., approximately zero, and remains there until an event occurs which changes the echo. At that time, a change in the channel results in changes in the filter output due to the signal's traveling a different path from the local party's telephone to the other end of the connection and back.

The adaptive FIR filter can detect a change in the path caused by such an event by: (1) comparing tap values; (2) examining frequency content; or (3) examining the power in the filter.

Although there are numerous ways to look for variations in the tap values, in the preferred embodiment of the invention, the pseudo-power of the frequency spectrum is monitored. This could be accomplished by simply summing up the tap values of the entire frequency spectrum. This would compress many numbers which represent the frequency spectrum into a single value representative of the entire spectrum. Due to the fact, however, that valid tap values can be both positive and negative, more than just a simple sum should be performed. Alternatively, filter tap values could be transformed into the frequency domain, but the transformation would require time to perform. Rather than wasting time performing the transform, an equivalent method of compressing many values into one value can be performed on the filter tap values.

Accordingly, it was decided to perform a sum of squares on the filter tap values. This method has several advantages. First no transform need be performed, thus saving processor resources and time. In addition, the sum of the squares of the tap values also avoids the problem of summing tap values having valid positive and negative values. Further, the method gives a pseudo-power measurement of the tap values in a single numerical representation. This single value is a convenient and viable measurement to follow over time, and provides the insight necessary to make a decision concerning the events of interest (e.g. three way, bridging, and call waiting).

The preferred embodiment uses the well known Normalized LMS with tap leakage algorithm for the adaptive filter. This method uses the outgoing inmate's voice in conjunction with the echoed return signal to adapt the filter. The intended use for this algorithm is to characterize the echoed signal's channel characteristics and remove the echo from the returned signal. Once the filter has performed this function and reached a steady state condition the telephone channel is characterized. From this point on, during the course of normal telephone use, the telephone channel does not change significantly. If the remote party attempts a three way or a conference bridge between two lines, or answers a call waiting notification, the telephone channel characteristics change, thus changing the echo characteristics. This will cause the adaptive filter to change from its' previous steady state condition to a new steady state condition. This change can be monitored and a determination of an event of interest can be made.

1. Logic for Detecting Significant Changes

In the preferred embodiment of the present invention, the filter is performed by software utilizing digital signal processing ("DSP") as described below. The hardware and software are illustrated, for example, as block 880 on FIG. 3A. In that regard, a processor should be chosen with enough precision to perform the Normalized LMS algorithm. Using today's standards as a measuring stick a processor which only utilizes 16 bits for its calculations would not be precise enough to get the filter to adapt in the appropriate manner without significant mathematical manipulation. However, a processor which utilizes 32 bits of precision would be more than adequate to perform this operation.

The adaptive filter is in a period of transition from start-up, i.e., when the call is initiated, to steady state, shortly after the telephone connection with the initial destination party has been established. This period is usually quite small depending on the adaption algorithm used by the filter. In the preferred embodiment of the invention the event detection means is disabled briefly during this transition. Once the filter has reached its steady state condition, the detection means is enabled.

Once steady state has been achieved and the event detection algorithm has been activated, it begins to look for significant changes in the sum of the squares of the filter tap values. In the preferred embodiment of the invention, the appropriate electronic signals are sampled, i.e., digitized, at a rate of 8000 samples per second. Thus, the filter receives a new sample every 125 microseconds. Theoretically, it would be possible to determine a new pseudo-power measurement every 125 microseconds utilizing the latest tap values. However, it is not necessary to perform these calculations and comparisons that frequently, since the events of interest take a number of seconds to occur. Instead, the filter tap values are checked and the sum of the squares calculated much less frequently. In the preferred embodiment of the invention, the calculation is performed every 0.25 second, i.e., 250 milliseconds.

The calculated sum of the squares value is then stored in a circular buffer, which keeps the latest values as a reference for determining whether an event of interest has occurred. In the preferred embodiment, the buffer contains five (5) values, i.e., the sum of the squares calculated from the tap values for the prior 1.25 seconds.

A number of protocols could be used for determining whether an event of interest has occurred using the calculated sum of the squares values. In the preferred embodiment, the value of the sum of squares calculated 1 second prior to the current sample is stored in a temporary position. The ratio of this temporary variable position and the most current value of the sum of the squares is computed by dividing the former by the latter. If the result of this division is less than a predetermined value, an event of interest is deemed to have occurred. The predetermined value used in the preferred embodiment is 0.6. It is anticipated that values ranging from approximately 0.8 to 0.5 could be used resulting in greater or lesser degrees of sensitivity and reliability in detecting the events of interest. In the preferred embodiment, a ratio of less than 0.6 indicates that the telephone channel characteristics have changed significantly enough from the steady state conditions to declare, at least initially, that an event of interest has occurred.

The preferred embodiment utilizes a 1 second reference period for determining whether a significant change has occurred in the echo characteristic. The burden of performing additional, more frequent comparisons of the ratio does not have a significant corresponding benefit. On the other hand, the use of larger reference time periods may result in missing certain events of interest. Thus, a typical time period is from one-half to a few, i.e., 2–3 seconds.

2. Analysis

The detection of a significant variation in the tap values in the filter is a reliable indication that a new channel of communication has been effected. At that time, one of the responses noted below could be implemented. On the other hand, such an implementation could be premature, since the change in the communication channel could be only temporary. This may occur, for example, in a situation where the communication with the remote party is temporarily altered by the activation of a call waiting service.

FIGS. 2A through 2D show the change in the output from the adaptive FIR filter associated with certain events.

FIG. 2A shows a typical change in output resulting from a completed three-way call. In this case the output of the filter after the call has been completed is substantially different from the baseline established prior to the initiation of the three-way call. It should be noted that when the remote party activates the hook switch, the local party is temporarily, put on hold. As a result, the line characteristics are changed, due to the fact that the central office has switched the line to quiet termination. Following the initial hook flash, the channel changes again to include the third party, causing the line path to change again as indicated by further changes in the reflected signal. In the preferred embodiment of the present invention, the device ultimately determines that there is an event of interest based upon, the fact that there is a significant change in the output of the FIR filter and that output did not return to the original baseline value.

FIG. 2B shows the typical output from the FIR filter after a call waiting notification signal has been transmitted to one or more of the parties. Regardless of its dissemination, the call notification signal does not result in a change in the filter output.

Figure 2C:
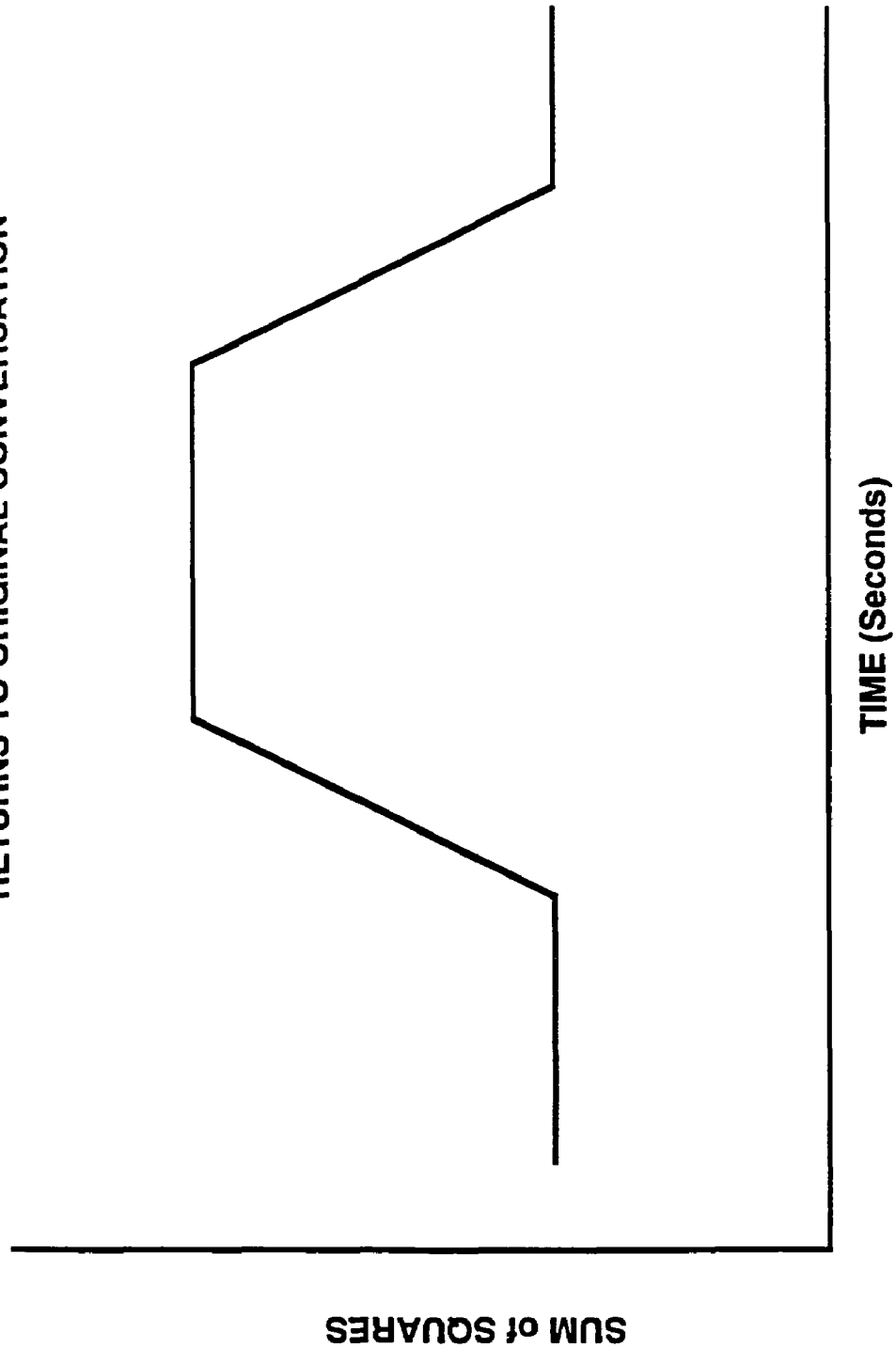

On the other hand, if the party who has the call waiting service responds to the third party notification signal by answering that call and temporarily responding to it, the output of the filter would change over time as shown in FIG. 2C. It should be noted, that in this case the output returns to its original baseline value when the answering party returns to the original conversation.

Figure 2D:
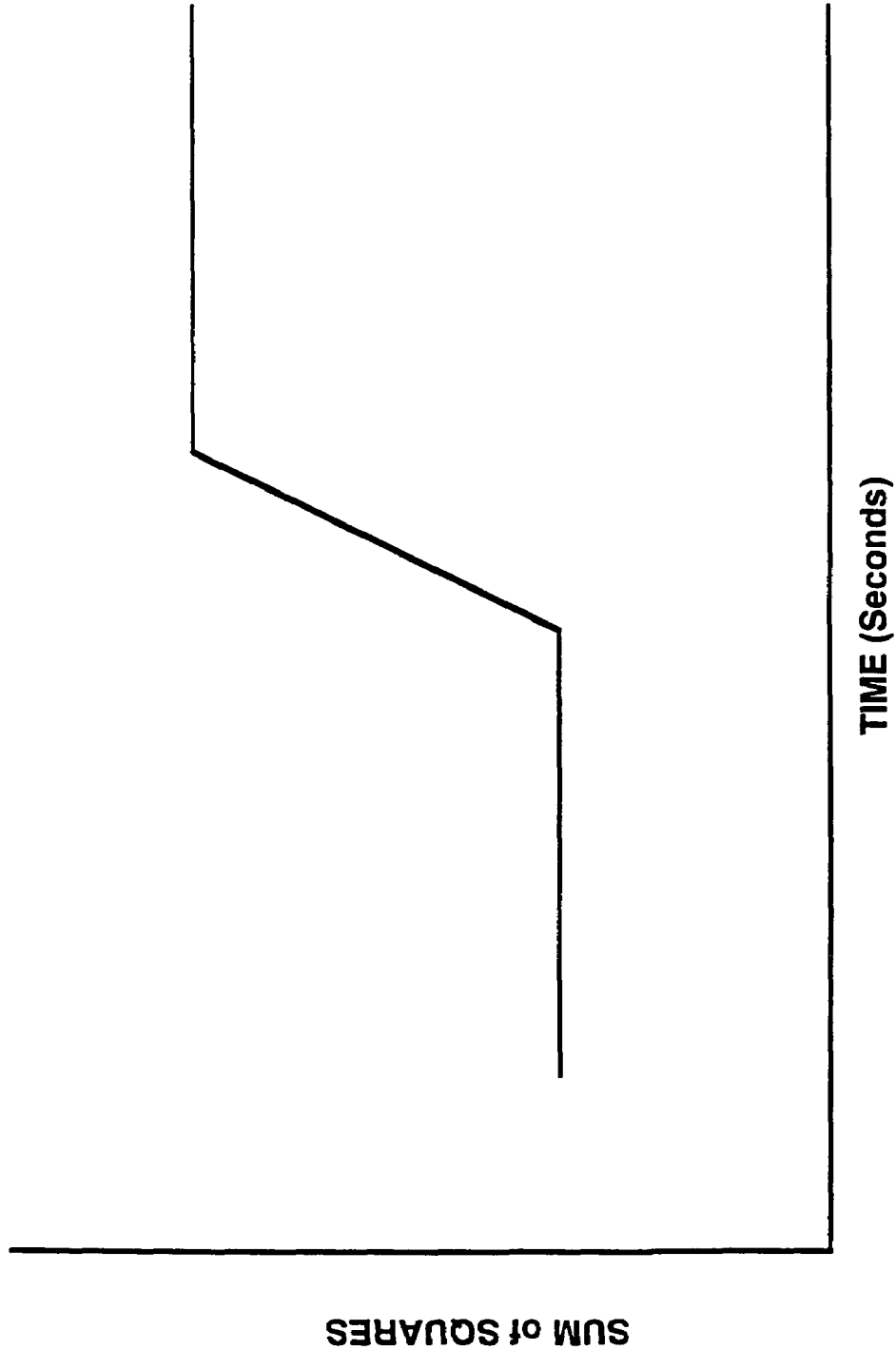

Finally, FIG. 2D illustrates the situation in which the party who has call waiting service responds to the third party notification signal by answering that call and temporarily dropping the original connection or, in the case of some advanced call waiting services, has added the additional party to the original connection.

These situations can be distinguished by continuing to monitor the sum of the squares of the filter tap values after an event of interest has initially been detected. The monitoring is performed in order to see if the sum of the squares returns to original baseline condition. This would indicate that the remote party received a call waiting notification, "flashed out" to talk to the third party and then returned to the original conversation or that some other event may have occurred which did not result in the establishment of a three-way or conference call. If the channel characteristics return to their original value, then the original change in channel characteristics would be ignored, and an event of interest would not be declared.

Alternatively, the apparent "flash out" occurrence could be noted/recorded for reference. Indeed, repeated "flash out" events could be detected and, if appropriately designated as an undesirable activity which could trigger a response, such as a warning message or disconnection, as applicable. This might be particularly useful to detect and prevent the remote party's acting as a "relay" for messages between the local party and a party at a secondary telephone destination by switching between separate connections with each.

Figure 5:
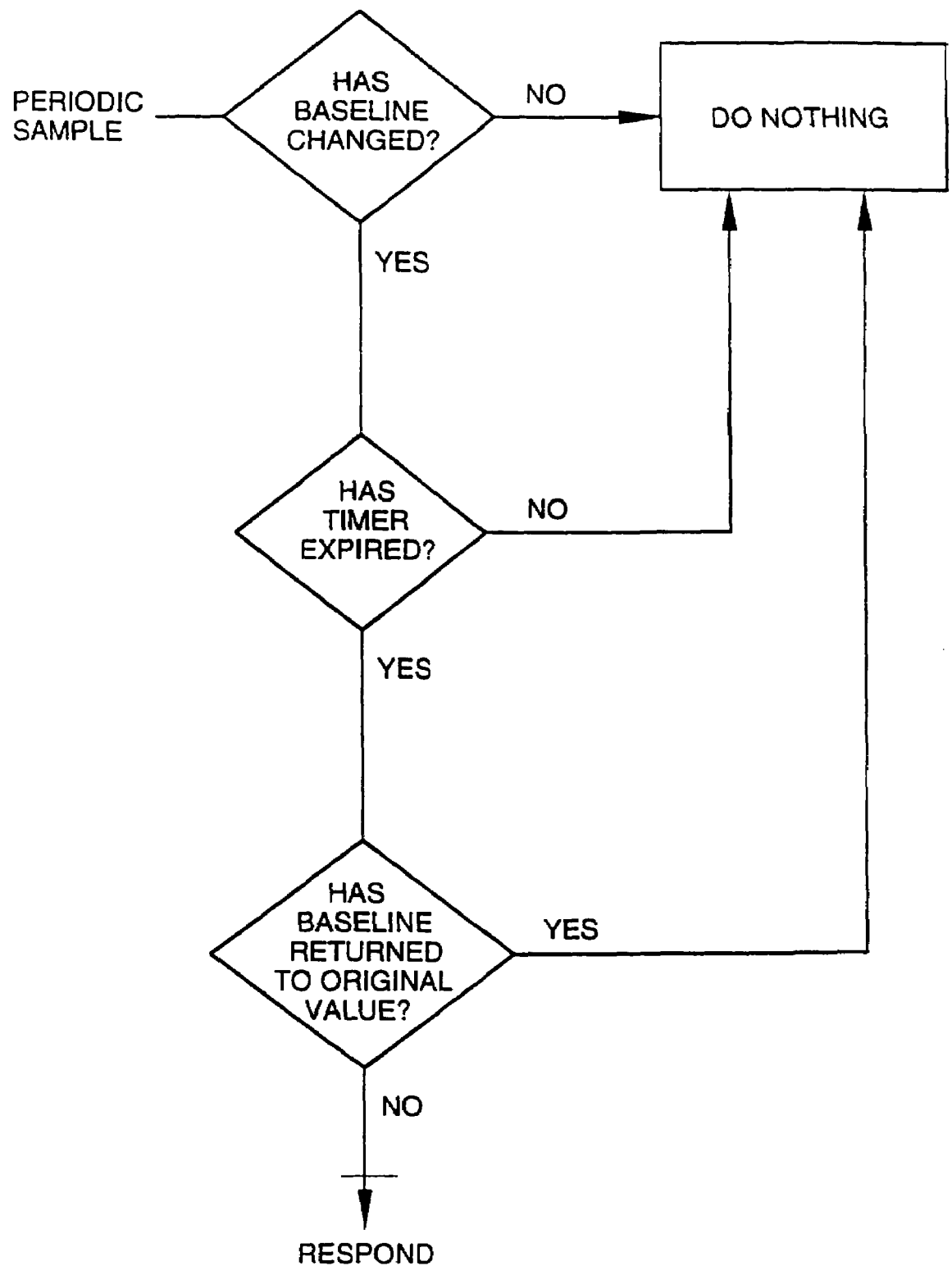
FIG. 5 is a logic diagram for a preferred analytical technique to verify that an event of interest has occurred consistent with the addition of a secondary telephone designation.

FIG. 5 is a logic diagram for a preferred analytical technique to verify that an event of interest has occurred consistent with the addition of a secondary telephone designation. The time period utilized in that technique may be from approximately three seconds to several minutes. A typical time period would be from 1 to 60 seconds. Obviously, if longer time periods are used greater buffer or other storage must be available to hold the prior baseline value of interest in the comparison. It should also be noted that, while the channel characteristics may not return to precisely the same value as originally, the variation in characteristics resulting from a return to the original signal pathway should be well outside the criteria used for determining whether a significant change initially occurred.

An event of interest can be declared after the initial change in channel characteristics or following confirmation that the characteristics have not returned to their original value. In either event, once an event of interest has been declared, that decision can be used to implement one or more responses. Such response may include call termination, playing a prerecorded message, generating a tone which may be heard by one or more parties to the call, muting the microphone of the local telephone and recording the date and time of the remote party's attempt to initiate a conference call. Typically, these responses are implemented or activated via conventional software and hardware. The response or responses which are employed can be selectively changed from time-to-time by the user.

3. Alternative Methods

The invention has been described in an event detection implementation using an adaptive FIR filter as effected in a Normalized LMS algorithm. This implementation is a preferred embodiment, because it works well with speech. As previously noted, it is also possible to use other techniques for identifying and monitoring an echo characteristic that changes with the addition of a secondary telephone destination to the communication.

For example, it is possible to use an adaptive IIR filter. Although an adaptive IIR filter processes incoming signals differently from an adaptive FIR filter, the output is the same. Thus, it would be possible to implement the invention with an adaptive IIR filter using the sum of the squares of the coefficients to identify and monitor the echo characteristic.

Although not as easy to use as an FIR or IIR filter, a lattice filter may also be used. Preferably, this would be employed with a Kalman algorithm.

In general, differences in either the time domain or the frequency domain between an outgoing signal and its "echo" can be used to ascertain an appropriate echo characteristic for a given telecommunication. In the time domain, the delay or phase response may be used to define an echo characteristic, although the latter, may be somewhat difficult to implement because the echo may contain multiple reflections. Nevertheless, such a characteristic might be ascertained using an IIR filter looking for a group delay. An auto correlation function algorithm may be used to ascertain the characteristic time delay in receiving back a stream of information corresponding to the original signal. In the frequency domain, the magnitude of the signal being returned (e.g., the percentage of signal strength) may define an echo characteristic. The shape of the spectrum may also be employed.

A significant change in echo characteristics can be ascertained by any of these techniques. The event detection may be followed by continuing analysis of the signal to confirm the nature of the event.

4. Advantages

An advantage of the present invention is that it can precisely distinguish the initiation of a three-way call from temporary activation of a call waiting service. In the case of a call waiting event, the channel path returns to its initial state and the echo returns to its original baseline. In contrast, the three-way call establishes a new channel path with new echo characteristics.

A further advantage of the present invention is that it can be utilized to detect conference calls which are initiated through means which do not involve activation of the hook switch. This can occur, for example, where two lines are "bridged" to create a call between three parties. When this occurs, it obviously results in a change in the communication path between the original remote and calling parties whose line is being monitored, and can be detected as such.

Further, the present invention is not prone to "false detects" which might be encountered with other three-way or conference detection technology. For example, the present invention will not be affected by one or more of the various call waiting notification signals that are generated by telephone service providers.

5. Call Forwarding Detection

The present invention can also be used to detect when a remote telephone has been forwarded to a third party. This is accomplished by electronically storing the echo characteristics of one or more calls previously made with the same remote telephone. Every time the number is called, the characteristics, once the filter is zeroed out, are compared against the stored value(s). If there is a substantial difference, this is an indication that the call has been forwarded.

B. System Configurations

Having described the basic steps involved in detecting events occurring during the communication between the remote and local parties, it is now possible to explain the general organization of the architecture appropriate to implement the present invention as shown in FIGS. 3A through 3D. The system is described in the context of an AOS.

FIGS. 3A–3D disclose four likely implementations for use of the present invention in telephone or telephone equipment related applications. It will be clear to those skilled in the art that other combinations of input (controlled telephone equipment) connections and output (monitored or remote telephone equipment) connections are easily configured by appropriate use of the information provided.

Figure 3A:
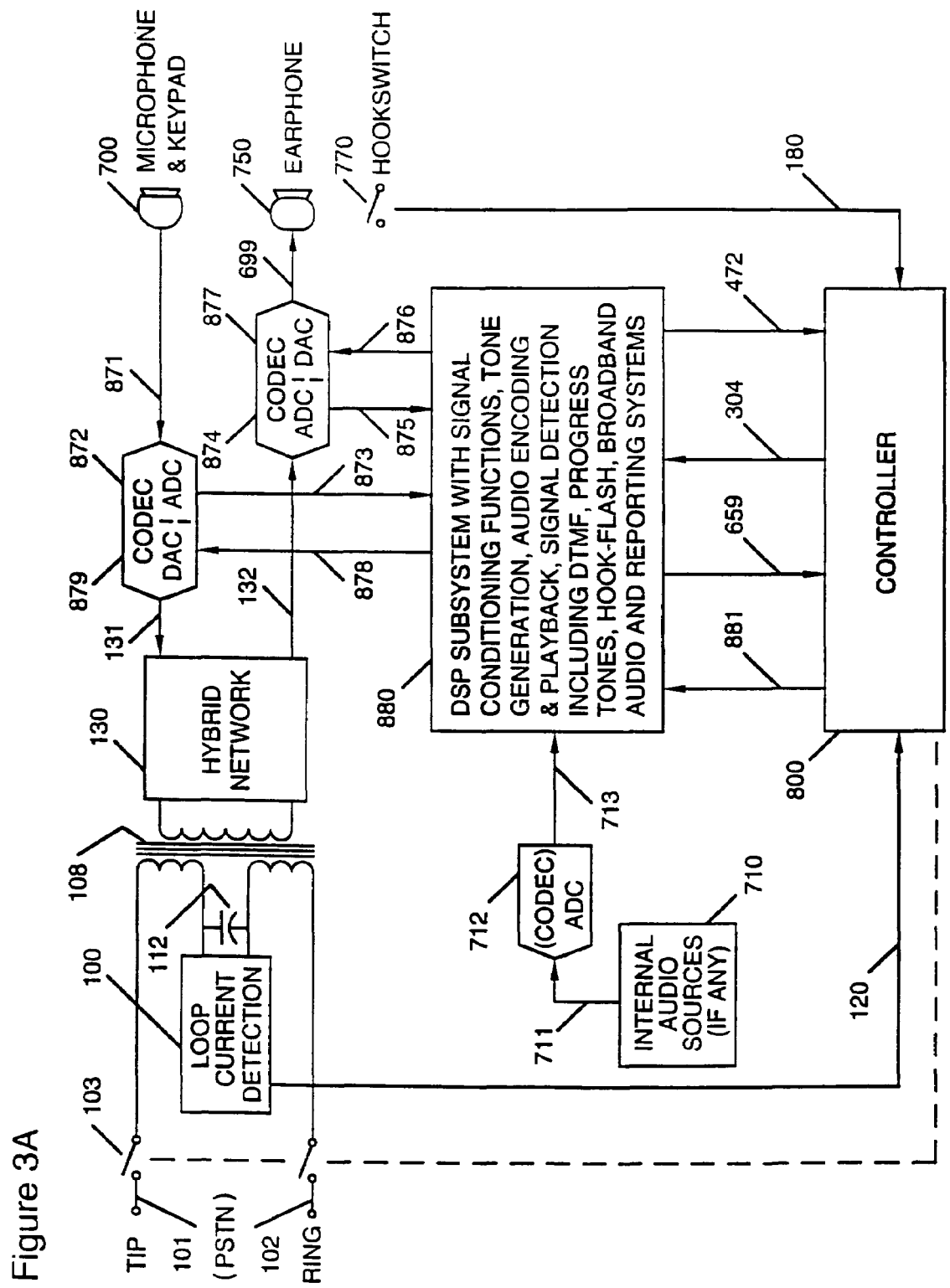
FIGS. 3A through 3D are block diagrams of the hardware in accordance with certain embodiments of the present invention as connected in several different telephone line situations.

FIG. 3A pertains to telephone equipment wherein the apparatus of the present invention is included as a direct subsystem of the telephone equipment. FIG. 4A indicates the relative placement of the present invention in such an implementation.

As shown in FIG. 3A, the present invention is incorporated with the controlled telephone equipment, in this example shown as a conventional telephone user interface consisting of a listening point indicated as an earphone 750 and sound sources indicated as microphone and DTMF generating keypad both shown as 700. In addition, a user activation element is shown as hookswitch 770. An example of such an arrangement is a telephone handset, cradle hookswitch, and DTMF generating keypad. In such an application the circuit shown could be powered by a power supply deriving its standby power requirements from a small wall-type transformer. The following discussion assumes such an application.

When the user of the controlled telephone equipment lifts the handset from the cradle the hookswitch 770 automatically sends user request signal 180 to the controller wherein the controller would send a command to the DSP subsystem via command signal 881 to generate a user dial tone and to begin looking for sound or, perhaps more simply, for DTMF tones on signal 871. The DSP subsystem 880 then creates the proper sequence of digital patterns which are sent as the current signal 876 to DAC 877 which in turn translates the digital signal 876 into the appropriate voltage pattern as analog signal 699 which is heard by the telephone equipment user on the earphone 750.

When the telephone equipment user presses a key on the keypad, a DTMF tone will be generated which will be presented on signal 871, which is digitized by ADC 872 and sent to the DSP subsystem 880 as the current signal 873. As the DSP subsystem is currently looking for, at least, DTMF tones it will detect and recognize the first DTMF tone. The DSP subsystem could then automatically stop generating the user dial tone or wait for the controller 800 to so instruct but in any case would send the value or meaning of the detected DTMF tone to the controller 800 over the circuit for signal 659. If so designed, the controller 800 would instruct the DSP subsystem 880 to stop generating the user dial tone going to the user earphone 750 but to continue looking for additional DTMF tones on signal 871. Each key pressed by the telephone equipment user would similarly be detected and sent to the controller 800 until the controller 800 determines that a complete sequence of digits has been entered. At that point, the controller 800 may optionally send a command to the DSP subsystem via signal 881 to discontinue looking for additional sound and/or DTMF digits.

At this point, the controller 800 might, for example, determine if the sequence of digits entered by the telephone equipment user corresponds to an "invalid" telephone number. A number may be deemed "invalid," for example, if the telephone equipment user were attempting to place a collect call to a public coin telephone or if the telephone equipment user were a prison inmate attempting to call a witness whose telephone number was listed in an appropriate database. If the controller determines that the number is invalid, it may take appropriate action, such as denying the attempted call to that number.

When ready to forward the call to the number requested by the telephone equipment user, controller 800 would seize the line 101, 102 by activating an appropriate relay or switch indicated as relay 103. The loop current detector 100 completes the DC path for the LEC switch causing DC current to flow in through the TIP and RING wires from the serving central office. The indicated loop start circuits could easily be replaced by ground-start circuits by one skilled in the art. Controller 800 would also send a command to the DSP subsystem 880, via signal 881, to look for sound or, more particularly network dial tone. Note that in this example the internal circuits of the present invention are isolated from the PSTN by transformer 108 and the loop current detector 100 which is commonly implemented using an optoisolator of sufficient voltage rating. Capacitor 112 is provided to complete the AC, or audio, path for the network TIP/RING pair. Note also that a two wire to four wire hybrid function 130 is provided to isolate the "outgoing" analog signals 131 from the "incoming" analog signals 132. The hybrid function 130 can be any of a number of the passive or active implementations well known in the art.

When the serving central office is ready to receive dialing instructions, it will send the dial tone signal on the TIP/RING pair. This signal will be coupled through transformer 108 to the hybrid function 130 where the dial tone signal is separated to the hybrid output signal 132. Signal 132, currently the network dial tone, is then connected to ADC 874 where the dial tone is converted to digital form and passed to the DSP subsystem 880 as signal 875. The DSP subsystem then passes information about the signal 132, 875 to the controller 880 via the reporting circuit signal 659. At this point the controller 800 would send an appropriate command to the DSP subsystem to prepare to generate DTMF tones via DAC 879 and a sequence of digits to the DSP subsystem to be sent to the PSTN. The DSP subsystem 880 accepts the command and digit sequence and proceeds to generate an appropriate digital pattern which is presented as signal 878 to the DAC 879 which in turn translates the digital pattern into an analog voltage 131. The hybrid function 130 takes the analog signal 131 and drives the transformer 108 and thus the PSTN TIP/RING pair with the requested DTMF tone. Clearly a pulse dial relay system could also be used to out pulse the requested digit sequence.

Two subsystems are available to send an audio, i.e., verbal, message to the telephone equipment user. First, the DSP subsystem can generate an appropriate sequence as signal 876, preferably as described by an internally stored message pattern. Alternately another audio source such as a recorded message or live microphone system indicated as 710 would provide the analog message 711 that can be digitized by ADC 712 into the digital signal 713 which the DSP subsystem would send as signal 876 to DAC 877 recreating signal 699 to the telephone equipment user earphone 750. A more direct, but perhaps more expensive, method would be to provide a direct analog path from source 710 to a mixer amplifier driving the earphone 750.

After the requested digit sequence has been delivered to the PSTN, the controller 800 would use one or more of the methods known to those skilled in the art to determine when the called party has "answered" such that a connection exists between the local and remote telephones. Controller 800 would next instruct the DSP subsystem 880 to neutralize the echo within signals 132, 878 due to current signals 871 and/or 711 at 131. At this point controller 800 would command the DSP subsystem 880 to look for a significant change in the characteristic echo indicating the addition of a secondary telephone destination. When such an event is detected by the DSP subsystem 880, the DSP subsystem 880 will preferably interrupt the controller 800 by signal 472. The controller may or may not have previously commanded the DSP subsystem to pass the digital signal 873 to signal 878. If so, the direct signal 304 may be used to mute the microphone 700 circuit. Alternatively, the DSP subsystem 880 could be commanded to pass only a portion of the microphone 700 signal such as through a high pass filter function perhaps with a low end pass frequency of 1500 Hz or so until the remote party answer has been confirmed. After the remote party answer has been confirmed controller 800 would proceed with an appropriate protocol and other command sequences not specifically concerned with the present invention. For the purpose of the present invention, at some point the combined controller 800 and DSP subsystem 880 can be assumed to enter a secondary destination detection mode. At that point, the DSP subsystem 880 will be looking for and reporting significant changes in the echo characteristics to the controller 800, and the controller 800 will be taking appropriate pre-programmed action. Each time the DSP subsystem 880 detects an event consistent with the addition of a secondary destination, signal controller 800 will be notified via signal 472. Controller 800 can issue commands, for example, to stop passing audio from signal 871 to 131, i.e., mute the controlled sound source. In any case, all necessary circuits and components are provided to detect and respond to the attempted addition of a secondary telephone destination.

Figure 3B:
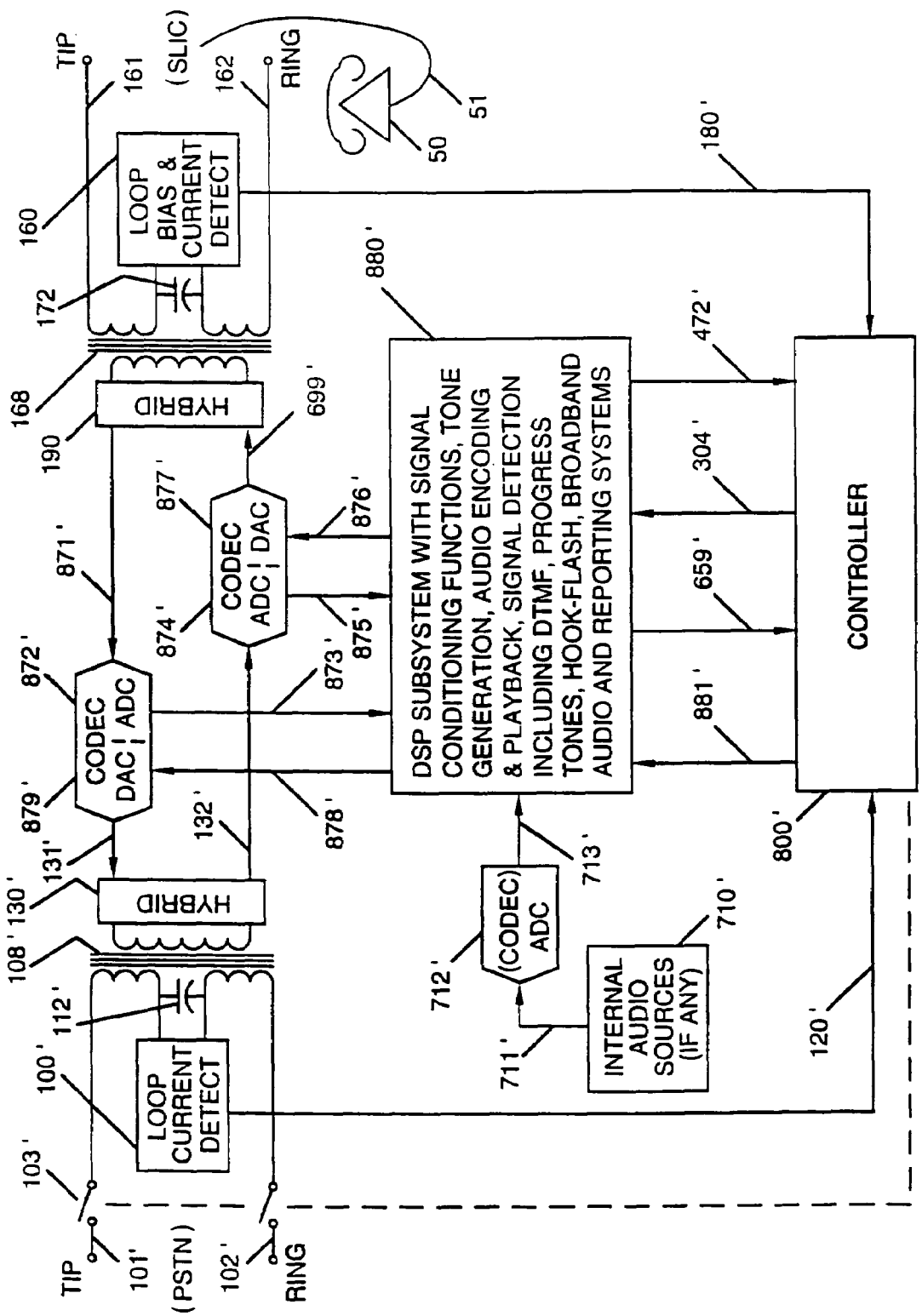

FIG. 3B shows the apparatus of the present invention as connected to an otherwise independent loop-start telephone or piece of telephone equipment by being placed electrically between the serving central office and the independent telephone or piece of telephone equipment. The indicated loop start circuits could easily be replaced by ground-start circuits by one skilled in the art. FIG. 4A indicates the relative placement of the present invention in such a case.

Comparing FIG. 3B with FIG. 3A, it is apparent that the only change to the overall circuit is to provide the circuitry necessary to disassociate the present invention from the controlled telephone equipment. This is accomplished by providing a loop bias ("talk battery") voltage and external telephone equipment off-hook detection circuits depicted as block 160. As the signals 871 and 699 are unidirectional, a second hybrid function 190 is provided to convert the unidirectional, i.e., four wire, signals to the two wire bidirectional form. Isolation is provided by transformer 168. AC audio circuit completion is provided by capacitor 172. The DC bias voltage is provided by the loop bias block 160. Block 160 also contains appropriate loop current detection in a manner similar to block 100. The resulting subscriber line interface circuit ("SLIC") looks exactly like a standard Telco central office TIP/RING pair and is designated by leads 161, 162. Any standard telephone interface equipment can be connected to the TIP/RING pair 161, 162 as shown by the telephone instrument 50 via telephone line 51.

When the telephone equipment 50 goes off hook, the loop current detector 160 will sense the occurrence and report to the controller via signal 180 exactly as in FIG. 3A.

Figure 3C:
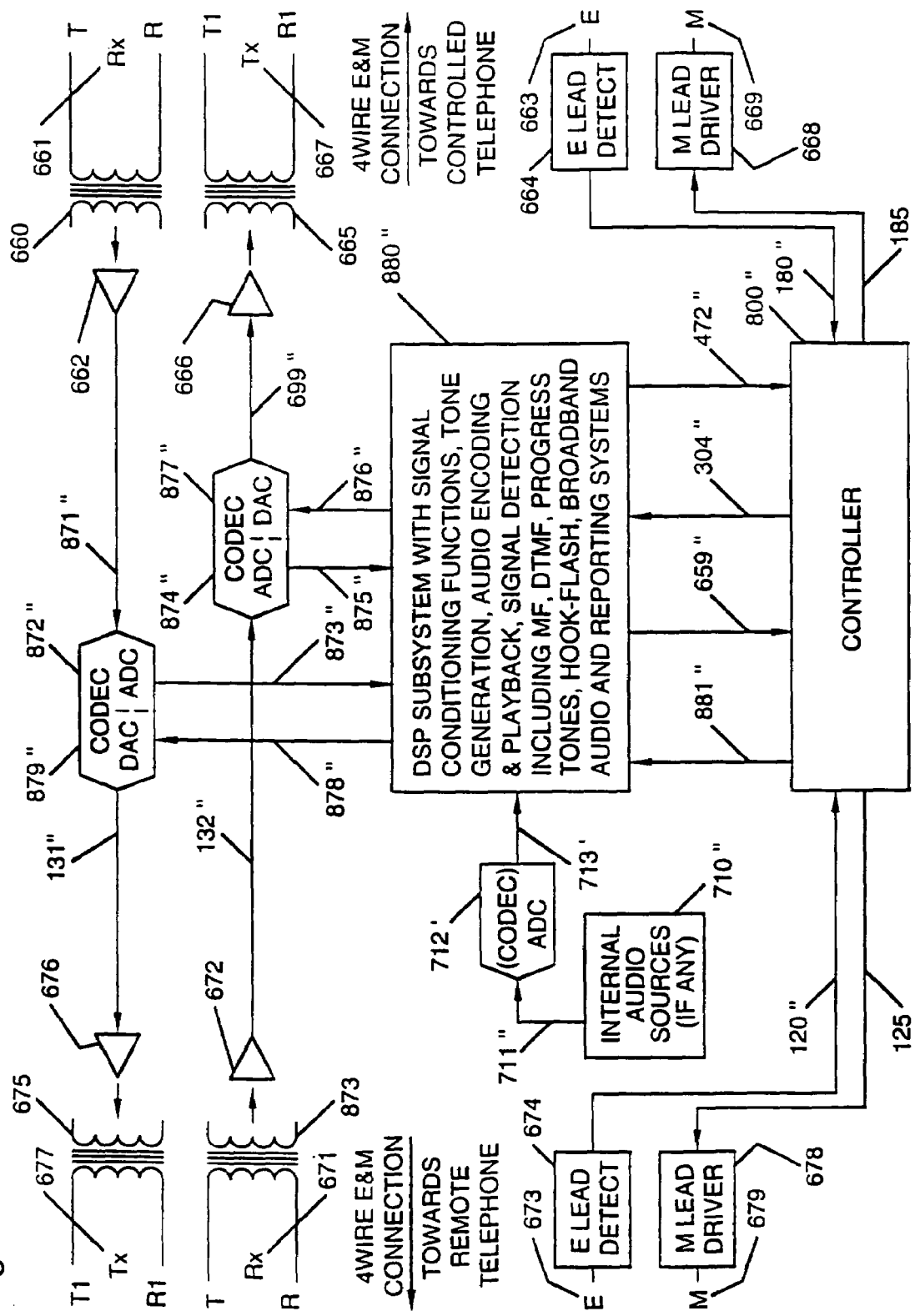
Figure 4C:
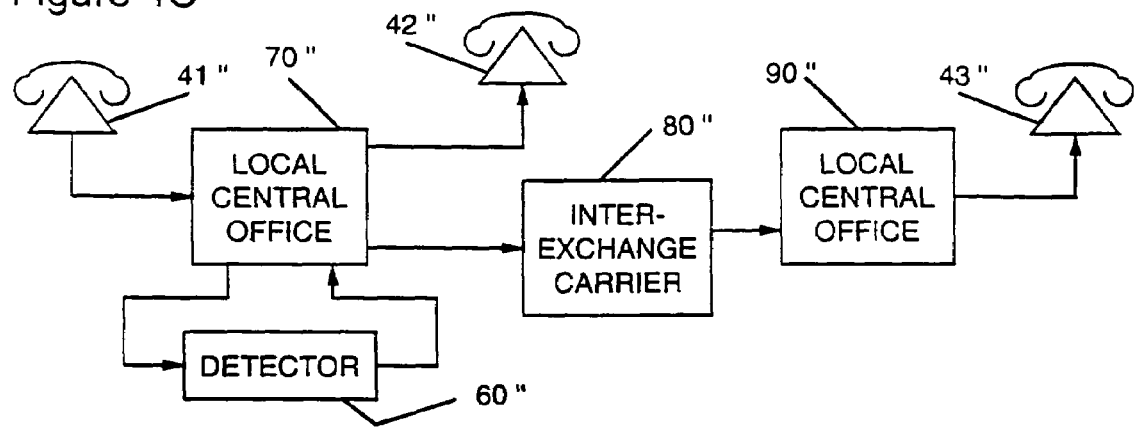
Figure 4D:
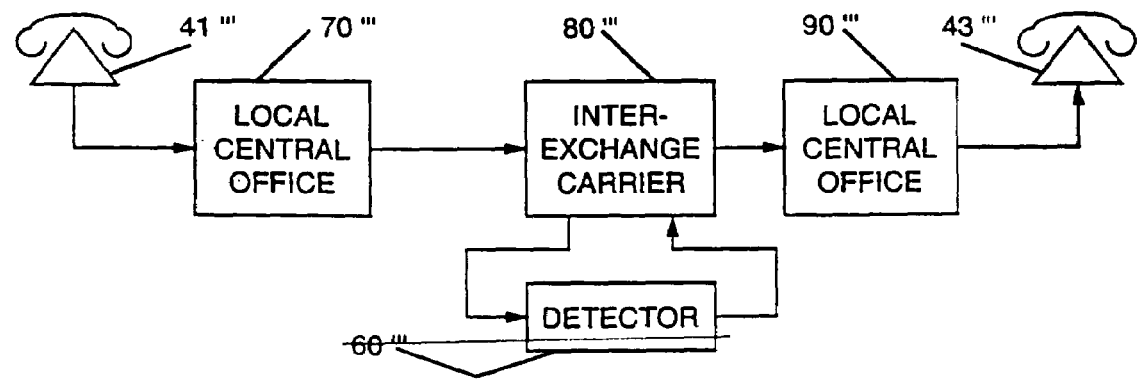

FIG. 3C pertains to a stand alone piece of telephone equipment using industry standard four wire plus E&M ("4E&M") analog interconnections intended to be connected within the PSTN. In this case, the present invention would not be connected directly to the telephone or telephone equipment receiving the control benefits of the present invention. Instead, it would be connected either between two switches (FIG. 4B) or as an adjunct to a switch (FIGS. 4C and 4D).

In the case shown in FIG. 3C, there are no loop current detectors or hybrid functions. In 4E&M circuits, the audio paths are always connected but not necessarily active. The equivalent to the controlled telephone going off-hook is when the E-lead 663 from the PSTN circuit providing the E-lead signal is activated. The equivalent signal is now a remote "service request" but is, in effect, the same as the controlled telephone equipment going off hook. The controlled telephone equipment E-lead is monitored by E-lead detector 664 and reported to the controller 800 as signal 180. Numerous circuits are known in the art, such as, isolation relays, transistor level shifters and, similar to loop current detectors, simple optoisolator circuits.

The controller 800 has the additional task in this network application of responding to the requesting PSTN switch with appropriate "winks" and "off hook" conditions on the M-lead. This is accomplished via signal 185 connected to an M-lead driver 668 which in turn commonly drives a mercury wetted relay as the actual M-lead signal. Other M-lead signal driving circuits are known in the art.

On the monitored telephone equipment side, a similar set of connections are disclosed. Instead of driving relay 103 as in FIG. 3A the monitored telephone equipment network switch is notified that service is requested by asserting signal 125 to the monitored side M-lead driver 678 which in turn drives the monitored side M-lead 679. Instead of waiting for a dial tone as in FIG. 3A and 3B, it is necessary to wait only for the monitored side switch to indicate service acceptance by the use of its E-lead signal 673. This is detected by the E-lead detector 674 and reported to the controller 800 via signal 120. In all other respects, the circuits described in FIG. 3C act in a manner similar to those in FIGS. 3A and 3B.

Figure 3D:
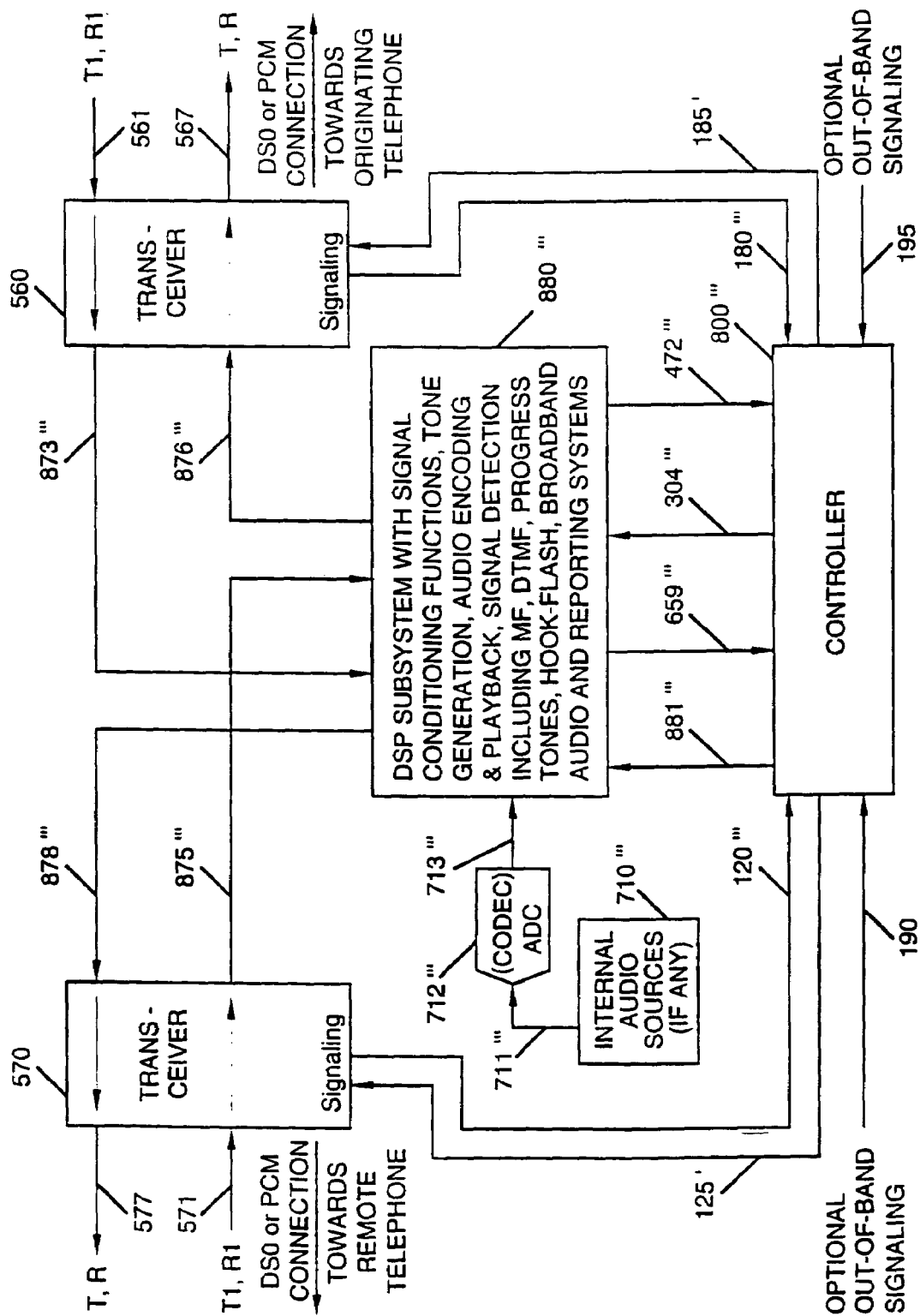

FIG. 3D is a block diagram which shows the general organization of the equipment of the present invention where the signals transmitted and received on the line are already digitized. This occurs, for example, where the detection equipment is located in the network as part of the transmission of a call which has already been digitized.

In this case, the present invention would not be connected directly to the telephone or telephone equipment receiving the control benefits of the present invention but rather either between two switches (FIG. 4B) or as an adjunct to a switch (FIGS. 4C and 4D).

The standard practice is currently to digitize the telephone audio signals at the LEC end office before transmission in digital form to another intra-LATA end office or to an inter exchange carrier for transmission to an inter-LATA end office. Each audio path equivalent is referred to as a trunk and the digitized trunk is referred to as a "DSØ" level signal. Multiple DSØ signals may be multiplexed over a single physical path, for example, DS1 and DS3 level paths, which are the normal signal connection levels to and from the LEC and/or IXC. For purposes of the present invention the DSP subsystem is described as an individual subsystem for each DSØ trunk. It may be clear to those normally skilled in the art that a DSP subsystem with sufficient speed (digital bandwidth) could directly handle multiple DSØ trunks by appropriately partitioning of memory and processing time.

Because the signal is digital form, it is not necessary to have analog to digital converters 872 and 874 shown in FIGS. 3A–3C. Instead, in the embodiment shown in FIG. 31D, there is a single analog to digital converter 712 which is used solely to convert internal audio sources 710, if any, such as tones or recorded messages, such as those that might be initiated by controller 800, if a connection to a secondary destination is confirmed.

In the case shown in FIG. 3D, there are no loop current detectors or hybrid functions. In DSØ circuits, the audio paths are always connected but not necessarily active. The equivalent to the controlled telephone going off hook is, in the case of in-band or robbed bit signalling, when the A-bit as part of signal 561 from the controlled telephone equipment PSTN is activated. The equivalent signal is now a remote 'service request" but is, in effect, the same as the controlled telephone equipment going off hook. The controlled telephone equipment service request A-bit is monitored by the indicated transceiver 560. This transceiver may be a combination of available circuits from, for example, Crystal Semiconductor Corporation, Austin, Tex., or may be implemented in a field programmable gate array such as available from Xilinx, Inc., San Jose, Calif. This A-bit signal is handled exactly as the E-lead in FIG. 3C. The signal equivalent to the M-lead is an outgoing or return A-bit sent by the controller 800 as signal 185 which is inserted into the PCM signal 567.

Similarly, the in-band or robbed bit service request from the present invention would be sent from the controller 800 as signal 125 which transceiver 570 inserts into the PCM bit stream 577 in the same manner as the other transceiver. The outgoing service acceptance will be sent by the PSTN receiving switch as the A-bit in PCM signal 571 which, in turn, is decoded by transceiver 570 and sent to controller 800 as signal 120.

An option to the in-band or robbed bit signals is the use of out-of-band signalling as in the case of SS7 or ISDN implementations. In this case the transceivers 560, 570 are primarily PCM buffers and the service request and acceptance signals are provided on the signal 195 from the controlled telephone equipment end and on signal 190 from the monitored telephone equipment end.

It should be noted that the use of the terms "local" and "remote" with respect to particular telephones, are not intended to limit the invention in any way, other than to illustrate specific embodiments or to assist in defining the location of the apparatus of the invention with respect to other pieces of equipment. In fact, the apparatus of this invention may be connected to any telecommunication between two parties in which one of the parties has a three-way calling feature or other conferencing capability, such as two line bridging, PBX switching, etc.

Similarly, it should be understood that reference to the apparatus of this invention being 'connected" to a telecommunication includes any configuration in which the apparatus of this invention is capable of monitoring the desired signals and responding in the desired manner, if the initiation of a three-way, conference call, or call diversion is detected.

The invention has been described in detail with reference to particular embodiments thereof, but it will be understood that various other modifications can be effected within the spirit and scope of this invention.

For example, in the embodiment described herein, the signal generated by the transmitter of the local party and the echo signal are used for monitoring the characteristics of the established connection to determine whether an event of interest has occurred. Typically this includes the sound of the local party's voice and associated background noise which is picked up by the local party's microphone. Instead of relying solely on the local party's voice for the reference signal, it would be possible to inject a signal of low amplitude to use for reference purposes. Care must be taken in determining the appropriate type of signal to use for this purpose. The injected signal should be of low enough amplitude to not be annoying to the call in progress, yet sufficiently strong that it will have a viable echo. One further qualification used for the injected signal is that is has to be of high enough amplitude in order to be useful notwithstanding the processing devices commonly used for echo cancellation and band limiting in telephone communications.

In addition, it is possible to use the technology of the present invention in conjunction with that of the '702 and '812 patents identified previously to determine whether a three-way call or conference call has been initiated. This could occur in both serial or parallel configurations that could increase the overall accuracy and effectiveness obtained over that to be achieved by any of the implementations alone. For example, one could use the detection means described in the '702 patent as a means for verifying that the output of the adaptive FIR filter should be analyzed more closely to determine if there has been any change in the telephone channel characteristics. Or if the filter output indicates that a change in channel characteristics has occurred, the signal detection means in the '702 Patent could be used for further confirmation that a three way call had been attempted. Other combinations of these technologies could be employed.

I claim:

1. A method for detecting whether a remote party, using a remote telephone to which a telephone connection between itself and a local telephone has been established, has forwarded a call from the local telephone to a secondary telephone destination comprising:

identifying an echo characteristic for said telephone connection after the connection has been established; and comparing the identified echo characteristic with at least one stored value for said echo characteristic from previous connection between said local telephone and said remote telephone to determine whether there is a significant difference between the identified echo characteristic and the stored echo characteristic indicating that the telecommunication to the remote telephone has been forwarded to a secondary telephone destination.

2. The method of claim 1, wherein said identifying of an echo characteristic is accomplished by ascertaining differences between a signal and an echo of said signal in the time domain.

3. The method of claim 1, wherein said identifying of an echo characteristic is accomplished by ascertaining differences between a signal and an echo of said signal in the frequency domain.

4. The method of claim 1, wherein said identifying of the echo characteristic is a step selected from the group consisting of identifying differences in the magnitude of the signal and an echo of the signal and identifying differences in the shape of the original signal and an echo of that signal.

5. The method of claim 1, wherein said identifying of an echo characteristic is accomplished by means selected from the group consisting of adaptive filtration with an FIR filter, adaptive filtration with a IIR filter, and adaptive filtration with a lattice filter.

6. The method of claim 1, wherein said identifying of a characteristic echo includes intercepting a signal returned from the remote telephone on the trunk side of the remote central office.

7. The method of claim 1, wherein said identifying of a characteristic echo includes receiving at the local telephone of a signal returned from the remote telephone.

8. The method of claim 1, wherein said identifying of a characteristic echo utilizes signals transmitted from and received by said local telephone.

9. The method of claim 1, wherein the signals transmitted from said local telephone includes a known signal generated for the purpose of identifying and monitoring the echo characteristic.

10. The method of claim 1, wherein the signals generated are selected from the group consisting of a signal with a specific tone and white noise.

11. The method of claim 1, wherein the identifying of a characteristic echo is accomplished by adaptive filtration with an FIR filter.

12. The method of claim 1, wherein the identifying of a characteristic echo is accomplished by summing the squares of the coefficients used by an adaptive FIR filter to minimize the echo.

13. The method of claim 1, further including the step of verifying that a change in the echo characteristic is caused by the forwarding of the remote telephone to a secondary telephone destination by continuing to monitor the echo characteristic, after determining that there is a significant difference in the echo characteristic and the store value, to determine whether the echo characteristic has returned to its stored value.

14. The method of claim 13, wherein the step of verifying comprises continuing to monitor the echo characteristic for a period of approximately 3 seconds to 3 minutes after the significant change to determine whether the echo characteristic has returned to its stored value.

15. The method of claim 1, further including the making of response when it is determined that a significant change in the echo characteristic has occurred consistent with the forwarding of the remote telephone to a secondary telephone destination.

16. The method of claim 15, wherein said response is selected from the group consisting of terminating the telephone connection, playing a prerecorded message, generating a tone which may be heard at one or more of the local or remote telephones, muting the microphone of the local telephone, and recording the date and time of the remote party's addition of a secondary telephone destination.

* * * * *